United States Patent
Hernowitz et al.

(10) Patent No.: US 6,273,299 B1
(45) Date of Patent: Aug. 14, 2001

(54) MULTI-CHAMBER BREAKFAST CEREAL DISPENSER

(75) Inventors: Ira Hernowitz, Vacaville; Steven M. Menow, Fairfield, both of CA (US); Charles Hartlaub, Glendale Heights, IL (US)

(73) Assignee: OddzOn, Inc., Pawtucket, RI (US)

( * ) Notice: Subject to any disclaimer, the term of this patent is extended or adjusted under 35 U.S.C. 154(b) by 0 days.

(21) Appl. No.: 09/580,087

(22) Filed: May 30, 2000

(51) Int. Cl.[7] .................................................. G01F 11/28
(52) U.S. Cl. ....................... 222/192; 222/450; 222/454; 53/467; 206/461
(58) Field of Search .................................... 222/450, 192, 222/454; 53/238, 474, 467, 473; 206/461, 466, 471

(56) References Cited

U.S. PATENT DOCUMENTS

| | | | |
|---|---|---|---|
| 770,485 | * 9/1904 | West | 222/545 |
| 2,721,005 | * 10/1955 | Lesnick | 222/147 |
| 2,985,343 | * 5/1961 | Mask | 222/442 |
| 3,126,125 | * 3/1964 | Eggers | 221/96 |
| 3,342,383 | 9/1967 | Klygis et al. | 222/454 |
| 3,685,702 | * 8/1972 | Erwin | 222/305 |
| 3,692,230 | * 9/1972 | Kapiloff | 229/43 |
| 5,060,814 | * 10/1991 | Oglesbee | 220/339 |
| 5,402,891 | * 4/1995 | Haven et al. | 206/477 |
| 5,588,563 | * 12/1996 | Liu | 222/158 |
| 5,636,740 | 6/1997 | Finkiewicz et al. | 206/457 |
| 5,678,709 | 10/1997 | Holley et al. | 215/11.4 |
| 5,954,241 | 9/1999 | Huang | 222/548 |
| 5,971,216 | 10/1999 | Robbins, III | 222/158 |
| 6,006,952 | * 12/1999 | Lucas | 222/211 |
| 6,155,422 | * 12/2000 | Kaminski | 206/459.5 |

FOREIGN PATENT DOCUMENTS 453695  6/1913  (FR).

* cited by examiner

Primary Examiner—Kevin Shaver
Assistant Examiner—F. Nicolas
(74) Attorney, Agent, or Firm—Marshall, O'Toole, Gerstein, Murray & Borun

(57) ABSTRACT

A breakfast cereal dispensing product may be provided with a product package, a breakfast cereal product attached to the product package, and a breakfast cereal dispenser attached to the product package. The breakfast cereal product may include a cereal box having breakfast cereal disposed therein. The breakfast cereal dispenser may include a container having a main chamber that is sized to hold a plurality of pieces of breakfast cereal and a dispensing structure having a dispensing chamber and a dispensing chamber opening. The dispensing structure may be provided with a movable member that is movable between a closed position in which the movable member closes the dispensing chamber opening and an open position in which the dispensing chamber opening is not closed by the movable member and a passageway that couples the main chamber to the dispensing chamber. The passageway may be sized to allow pieces of breakfast cereal to pass between the main chamber and the dispensing chamber.

21 Claims, 2 Drawing Sheets

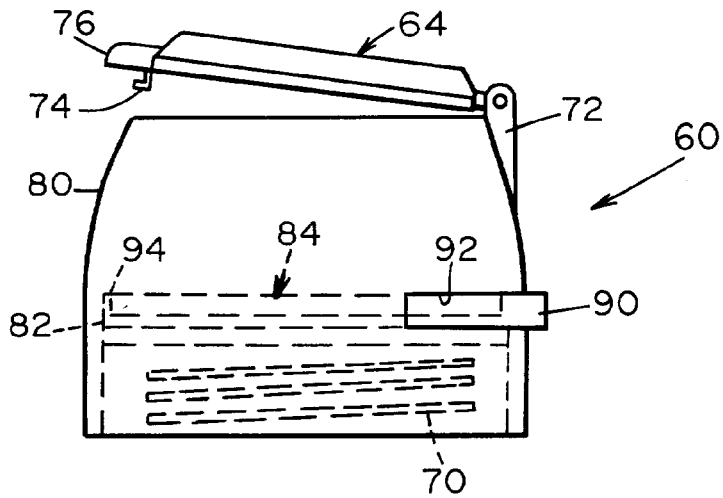
FIG. 3
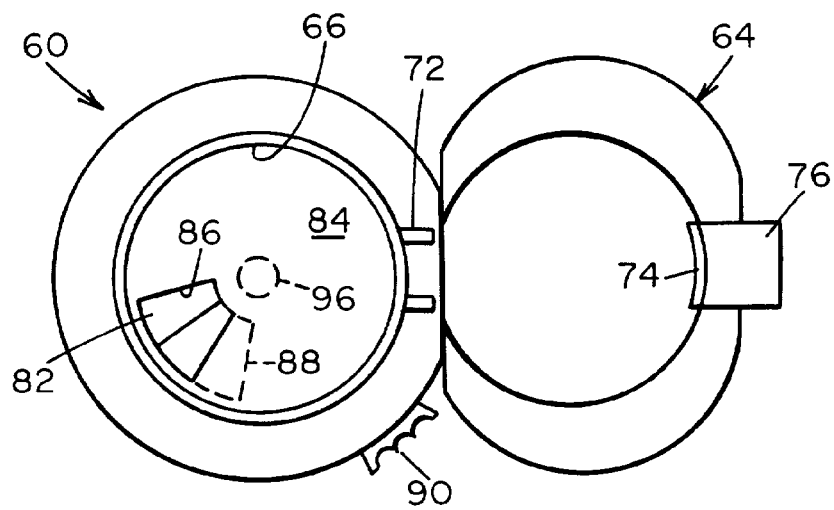
FIG. 4
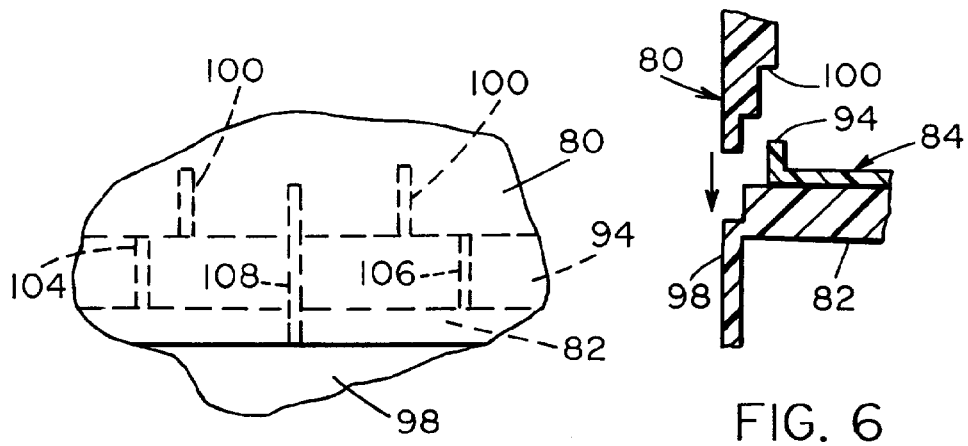
FIG. 5
FIG. 6

MULTI-CHAMBER BREAKFAST CEREAL DISPENSER

BACKGROUND OF THE INVENTION

The present invention is directed to a multi-chamber breakfast cereal dispenser for storage and dispensing of breakfast cereal such as Cheerios® brand breakfast cereal.

Various storage and/or dispensing devices have been previously described. For example, U.S. Pat. No. 5,678,709 to Holley, et al. discloses one embodiment, in FIGS. 7–9, of a multi-chamber apparatus having an interior chamber disposed within a bottle 310 and a spherically shaped hollow member 320 having an open neck portion and a lower opening 325 disposed opposite the open neck portion. The bottle 310 has an opening 315, and the orientation of the spherical member 320 may be changed between a first position in which the opening 325 in the spherical member 320 is aligned with the bottle opening 315 and a second position in which a wall portion of the spherical member 320 blocks the bottle opening 315.

U.S. Pat. No. 5,954,241 to Huang discloses a container having a cover with a hole formed therein and a valve plate 37 having a hole formed therein. The valve plate 37 is rotatably disposed on top of the cover and has a tab member 44 that may be used to rotate the valve plate 37 relative to the cover. When the valve plate 37 is rotated so that the hole in the valve plate 37 is aligned with the hole in the cover, material may be dispensed from the container.

SUMMARY OF THE INVENTION

In one aspect, the invention is directed to a multi-chamber breakfast cereal dispenser having a container with a main chamber that is sized to be capable of holding a plurality of pieces of breakfast cereal and a dispensing structure coupled to a portion of the container and having a dispensing chamber disposed therein and a dispensing chamber opening.

The dispensing structure may include a cover that is movable between a closed position in which the cover closes the dispensing chamber opening and an open position in which the dispensing chamber opening is not closed by the cover and in which cereal can be dispensed from the dispensing chamber. The dispensing structure may include a first hole, a second hole formed in a rotatable plate, and a tab member coupled to the rotatable plate.

The tab member may extend through an opening formed in the dispensing structure to allow a user to selectively position the rotatable plate between a first position in which at least a portion of the second hole is aligned with the first hole so that breakfast cereal can pass from the main chamber to the dispensing chamber and a second position in which the second hole is not aligned with the first hole and in which a portion of the rotatable plate blocks the first hole so that breakfast cereal cannot pass from the main chamber to the dispensing chamber.

The dispensing structure may also include a first locking structure that causes the rotatable plate to be retained in the first position and a second locking structure that causes the rotatable plate to be retained in the second position. Each of the locking structures may be provided in the form of an indentation formed on the rotatable plate. The dispensing structure may also include a locking structure that causes the cover to be retained in the closed position.

The container may have a neck portion, and the dispensing structure may be threadably coupled to the container at the neck portion. The container may have a top portion, a bottom portion, and an intermediate portion disposed between the top portion and the bottom portion, and the diameter of the intermediate portion may be less than the diameter of the top and bottom portions to facilitate the intermediate portion of the container to be gripped by a person's hand.

In another aspect, the invention is directed to a breakfast cereal dispensing product having a product package, a breakfast cereal product attached to the product package, and a breakfast cereal dispenser attached to the product package. The breakfast cereal product may include a cereal box having breakfast cereal disposed therein. The breakfast cereal dispenser may include a container having a main chamber that is sized to hold a plurality of pieces of breakfast cereal and a dispensing structure having a dispensing chamber and a dispensing chamber opening. The dispensing structure may be provided with a movable member that is movable between a closed position in which the movable member closes the dispensing chamber opening and an open position in which the dispensing chamber opening is not closed by the movable member and a passageway that couples the main chamber to the dispensing chamber. The passageway may be sized to allow pieces of breakfast cereal to pass between the main chamber and the dispensing chamber.

The product package may include a backing member, such as a piece of cardboard, and a piece of transparent material attached to the backing member that covers either the breakfast cereal product or the breakfast cereal dispenser, or both. The cereal box may have a height of no greater than about 15 centimeters and a width of no greater than about 10 centimeters.

The features and advantages of the present invention will be apparent to those of ordinary skill in the art in view of the detailed description of the preferred embodiment, which is made with reference to the drawings, a brief description of which is provided below.

BRIEF DESCRIPTION OF THE DRAWINGS

FIG. 3 is a side view of a dispensing structure which may form part of the dispenser;

FIG. 4 is a top view of the dispensing structure of FIG. 3 with the cover of FIG. 3 shown in an open position;

FIG. 5 is a side view of a portion of the dispensing structure of FIG. 3; and

FIG. 6 is a cross-sectional side view of a portion of the dispensing structure of FIG. 3.

DETAILED DESCRIPTION OF VARIOUS EMBODIMENTS

Figure 1:
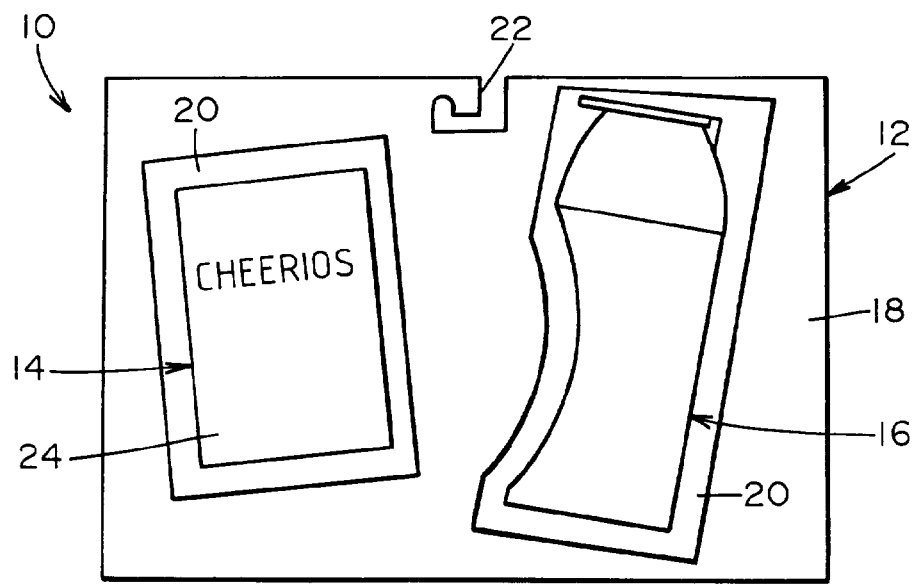
FIG. 1 is a side view of one embodiment of a breakfast cereal dispensing product in accordance with the invention having a breakfast cereal product and a breakfast cereal dispenser.

FIG. 1 illustrates one possible embodiment of a breakfast cereal dispensing product 10 in accordance with the invention. Referring to FIG. 1, the breakfast cereal dispensing product 10 may be provided with a product package 12, a breakfast cereal product 14 attached to the package 12, and a breakfast cereal dispenser 16 attached to the package 12. The product package 12 may include a backing member 18, such as a flat piece of cardboard having textual information and/or decorative images printed thereon, and one or more pieces of transparent material 20, such as plastic. The pieces of transparent material 20 may completely cover the breakfast cereal product 14 and the dispenser 16 and may be attached to the backing member 18 in any manner, such as by adhesive. The backing member 18 may have a slot or aperture 22 formed therein to facilitate hanging of the product 10 on a hook or other member (not shown).

The breakfast cereal product 14 may be provided in the form of a miniature cereal box 24 filled with breakfast cereal, such as Cheerios® brand cereal, which comprises a plurality of pieces of oat cereal each of which is shaped generally like the letter "O." The cereal box 24 may be formed in the shape of a hexahedron, having six sides each of which is perpendicular to at least another one of the sides. The cereal box 24 may have a height no greater than about 15 centimeters and a width no greater than about 10 centimeters. The cereal box 24 may be a standard-sized, miniature box having a height of about 10 centimeters (e.g. 4.1 inches), a width of about seven centimeters (e.g. 2.875 inches), and a depth of about four centimeters (e.g. 1.6 inches).

Figure 2:
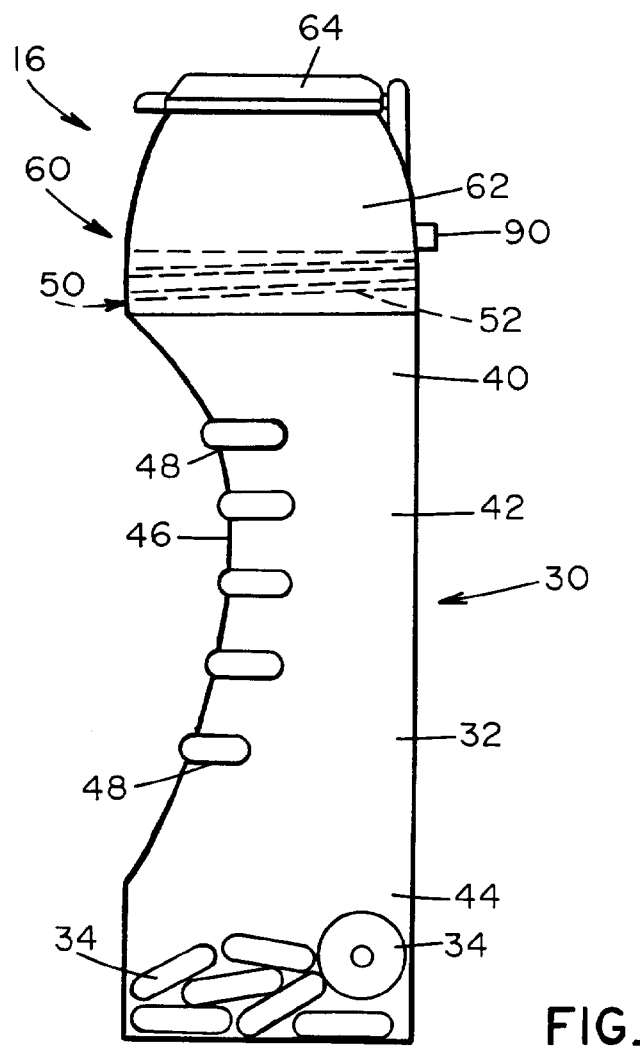
FIG. 2 is a side view of the breakfast cereal dispenser shown in FIG. 1.

FIG. 2 is a side view of the dispenser 16 shown in FIG. 1. Referring to FIG. 2, the dispenser 16 may be provided with a main container 30 having a main chamber 32 disposed therein. The main chamber 32 may be provided with a relatively large volume so as to be capable of storing all of the breakfast cereal contained in the cereal box 24. The main chamber 32 is shown in FIG. 2 with a plurality of pieces 34 of Cheerios® brand breakfast cereal stored therein. The main container 30 may be provided with a top portion 40, an intermediate portion 42, and a bottom portion 44, and the diameter of the intermediate portion 42 may be made smaller than both of the diameters of the top and bottom portions 40, 44 to facilitate gripping of the main container 30 by a person's hand. The intermediate portion 42 may be provided with an inwardly curved section 46 having a plurality of finger grips 48 formed thereon. The main container 30 may be provided with an upper neck 50 having a connecting structure, such as one or more threads 52 formed thereon. The main container 30 may be composed of a plastic material, such as a flexible plastic material.

A dispensing structure, such as a dispensing cap 60, may be removably attached to the main container 30. A dispensing chamber 62 may be provided in the dispensing cap 60, and the dispensing chamber 62 may have a volume that is smaller than that of the main chamber 32 disposed in the container 30. The dispensing cap 60 may be provided with a cover 64 that is movable between a closed position (shown in FIG. 2) in which the cover 64 closes the dispensing chamber 62 and an open position in which an opening 66 (FIG. 4) in the dispensing cap 60 is exposed so as to allow pieces 34 of cereal to be dispensed from the dispensing chamber 62 to a person's hand or mouth, for example.

FIG. 3, which is a side view of the dispensing cap 60, and FIG. 4, which is a top view of the dispensing cap 60 with the cover 64 shown in an open position, illustrate further details regarding the dispensing cap 60. Referring to FIGS. 3 and 4, the dispensing cap 60 may be provided with a coupling structure, such as a plurality of threaded segments 70, which allow the dispensing cap 60 to be threadably coupled to the main container 30. The cover 64 may be pivotably coupled to the dispensing cap 60 between a pair of arms 72 integrally formed with the dispensing cap 60. The dispensing cap 60 may have a latch or locking structure 74, which may be composed of slightly flexible plastic, that allows the cover 64 to be locked in its closed position shown in FIG. 2, by making latching contact with an interior surface of a top portion of the dispensing cap 60. The cover 64 may be provided with an outwardly extending member 76 to facilitate the opening and closing of the cover 64.

The dispensing cap 60 may be provided with a side wall 80, which may be curved, a bottom wall 82 joined to the side wall 80, and a rotatable member, which may be in the form of a rotatable plate 84 disposed directly above the bottom wall 82. As shown in FIG. 4, the rotatable plate 84 has an opening 86 formed therein, and the bottom wall 82 has an opening 88 therein. The rotatable plate 84 may be provided with a extending member or tab member 90, which may extend outwardly from the rotatable plate 84 through an opening or slot 92 formed in the side wall 80, so that movement of the tab member 90 within the slot 92 by a user causes rotation of the plate 84 within the dispensing cap 60, and thus causes the alignment of the opening 86 in the rotatable plate 84 to change relative to the opening 88 in the bottom wall 82. The rotatable plate 84 may be provided with an upwardly extending outer peripheral edge 94, and the rotatable plate 84 may having a downwardly extending cylindrically shaped extension 96 that is rotatably disposed in a hole formed in the bottom wall 82.

FIG. 6 illustrates a portion of one embodiment of the dispensing cap 60 in which the sidewall 80 which defines the upper portion of the dispensing cap 60 is initially provided separately from the bottom wall 82 and a lower neck portion 98 of the dispensing cap 60. In this embodiment, during manufacture, after the rotatable plate 84 is placed on top of the bottom wall 82 with the downwardly extending member 96 of the rotatable plate 84 disposed in the center hole (not shown) in the bottom wall 82, the side wall 80 is then permanently connected, such as by adhesive, over the rotatable plate 84, so that one or more retaining members or tabs 100 on the side wall 80 are disposed above the peripheral edge 94 of the rotatable plate 84 to maintain the rotatable plate 84 within a horizontal plane of rotation.

Referring to FIG. 5, the dispensing cap 60 may be provided with a pair of locking structures, which may be in the form of slots or indentations 104, 106 formed on the peripheral edge surface 94 of the rotatable plate 84. The interior surface of the side wall 80 may be provided with a tab 108 that may extend into the indentations 104, 106. The indentations 104, 106 may be spaced apart by a distance that corresponds with the length of the slot 92 through which the tab 90 extends, so that when the tab 90 is disposed at one end of the slot 90, the rotatable plate 84 will be locked in a position in which the apertures 86, 88 are aligned to allow pieces 34 of cereal to pass from the main chamber 32 to the dispensing chamber 62 through the apertures 86, 88, and so that when the tab 90 is disposed at the other end of the slot 90, the rotatable plate 84 will be locked in a position in which the apertures 86, 88 are not aligned, to prevent pieces 34 of cereal from passing from the main chamber 32 to the dispensing chamber 62 through the apertures 86, 88.

In use, the cap 60 may be unthreaded from the main container 30 of the dispenser 16, the main chamber 32 may be filled with cereal pieces 34 from the cereal box 24, and the cap 60 may be threaded back onto the main container 30. The tab 90 may be moved to a first position (which may be adjacent one end of the slot 92) in which the apertures 86, 88 are at least partially aligned, and the dispenser 16 can then be inverted so the cereal pieces 34 pass through the aligned apertures 86, 88 and into the dispensing chamber 62. With the dispenser 16 still inverted, the tab 90 may be moved to a second position (which may be adjacent the other end of the slot 92) in which the apertures 86, 88 are not aligned and in which a portion of the rotatable plate 84 blocks the aperture 88 formed in the bottom wall 82. As a result of the above steps, a measured amount of cereal may be transferred to the dispensing chamber 32. The above steps may be performed by an adult or parent of a child.

With the measured amount of cereal disposed in the dispensing chamber 32, the dispenser 16 may be given to a child, who may then dispense the cereal 34 from the dispensing chamber 62 by opening and closing the cover 64. In the event the child drops the dispenser 16 with the cover 64 open, only the cereal 34 disposed in the dispensing chamber 32 may spill, and the cereal 34 disposed in the main chamber 32 would not spill.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A multi-chamber breakfast cereal dispenser, comprising:
   a container having a main chamber disposed therein, said main chamber having a volume;
   a plurality of pieces of breakfast cereal disposed in said main chamber of said container;
   a dispensing structure coupled to an upper portion of said container, said dispensing structure having a dispensing chamber disposed therein and a dispensing chamber opening, said dispensing chamber having a volume that is smaller than said volume of said main chamber, said dispensing structure comprising:
      a coupling structure that removably attaches said dispensing structure to said container;
      a bottom wall having a hole formed therein;
      a side wall joined to said bottom wall;
      a cover that is movable between a closed position in which said cover closes said dispensing chamber opening and an open position in which said dispensing chamber opening is not closed by said cover and in which said pieces of cereal can be dispensed from said dispensing chamber;
      a rotatable plate having a hole formed therein; and
      a tab member coupled to said rotatable plate, said tab member extending through a slot formed in said side wall to allow a user to selectively position said rotatable plate between a first position in which at least a portion of said hole in said rotatable plate is aligned with said hole in said bottom wall so that a plurality of said pieces of breakfast cereal can pass from said main chamber to said dispensing chamber and a second position in which said hole in said rotatable plate is not aligned with said hole in said bottom wall and in which a portion of said rotatable plate blocks said hole in said bottom wall so that said pieces of breakfast cereal cannot pass from said main chamber to said dispensing chamber.

2. A breakfast cereal dispenser as defined in claim 1 wherein said container has an upper neck portion and wherein said dispensing structure is threadably coupled to said container at said upper neck portion.

3. A breakfast cereal dispenser as defined in claim 1 wherein said container has a top portion having a diameter, a bottom portion having a diameter, and an intermediate portion disposed between said top portion and said bottom portion, said intermediate portion having a diameter that is less than said diameter of said top and bottom portions to facilitate said intermediate portion of said container to be gripped by a person's hand.

4. A breakfast cereal dispenser as defined in claim 1 wherein each of said pieces of breakfast cereal comprises a piece of oat cereal generally shaped like the letter "O."

5. A breakfast cereal dispenser as defined in claim 1 wherein said dispensing structure additionally comprises:
   a first locking structure that causes said rotatable plate to be retained in said first position; and
   a second locking structure that causes said rotatable plate to be retained in said second position.

6. A breakfast cereal dispenser as defined in claim 5 wherein each of said locking structures comprises an indentation formed on said rotatable plate.

7. A breakfast cereal dispenser as defined in claim 1 wherein said dispensing structure additionally comprises a locking structure that causes said cover to be retained in said closed position.

8. A multi-chamber breakfast cereal dispenser, comprising:
   a container having a main chamber disposed therein, said main chamber being sized to be capable of holding a plurality of pieces of breakfast cereal;
   a dispensing structure coupled to a portion of said container, said dispensing structure having a dispensing chamber disposed therein and a dispensing chamber opening, said dispensing structure comprising:
      a cover that is movable between a closed position in which said cover closes said dispensing chamber opening and an open position in which said dispensing chamber opening is not closed by said cover and in which said pieces of cereal can be dispensed from said dispensing chamber;
      a first hole formed in said dispensing structure;
      a second hole formed in said dispensing structure, said second hole being formed in a rotatable plate; and
      a tab member coupled to said rotatable plate, said tab member extending through an opening formed in said dispensing structure to allow a user to selectively position said rotatable plate between a first position in which at least a portion of said second hole is aligned with said first hole so that a plurality of said pieces of breakfast cereal can pass from said main chamber to said dispensing chamber when said pieces of breakfast cereal are disposed in said main chamber and a second position in which said second hole is not aligned with said first hole and in which a portion of said rotatable plate blocks said first hole so that said pieces of breakfast cereal cannot pass from said main chamber to said dispensing chamber when said pieces of breakfast cereal are disposed in said main chamber.

9. A breakfast cereal dispenser as defined in claim 8 herein said container has a neck portion and wherein said dispensing structure is threadably coupled to said container at said neck portion.

10. A breakfast cereal dispenser as defined in claim 8 wherein said container has a top portion having a diameter, a bottom portion having a diameter, and an intermediate portion disposed between said top portion and said bottom portion, said intermediate portion having a diameter that is less than said diameter of said top and bottom portions to facilitate said intermediate portion of said container to be gripped by a person's hand.

11. A breakfast cereal dispenser as defined in claim 8 wherein a plurality of pieces of breakfast cereal are disposed in said main chamber, each of said pieces of breakfast cereal comprising a piece of oat cereal generally shaped like the letter "O."

12. A breakfast cereal dispenser as defined in claim 8 wherein said dispensing structure additionally comprises:
   a first locking structure that causes said rotatable plate to be retained in said first position; and
   a second locking structure that causes said rotatable plate to be retained in said second position.

13. A breakfast cereal dispenser as defined in claim 12 wherein each of said locking structures comprises an indentation formed on said rotatable plate.

14. A breakfast cereal dispenser as defined in claim 8 wherein said dispensing structure additionally comprises a locking structure that causes said cover to be retained in said closed position.

15. A breakfast cereal dispensing product, comprising:
   a product package;
   a breakfast cereal product attached to said product package, said breakfast cereal product comprising:
      a cereal box having six sides, each of said six sides being perpendicular to at least another one of said six sides;
      a plurality of pieces of breakfast cereal disposed in said cereal box;
   a breakfast cereal dispenser attached to said product package, said breakfast cereal dispenser comprising:
      a container having a main chamber disposed therein, said main chamber being sized to be capable of holding a plurality of pieces of breakfast cereal;
      a dispensing structure coupled to a portion of said container, said dispensing structure having a dispensing chamber disposed therein and a dispensing chamber opening;
      a movable member associated with said dispensing structure, said movable member being movable between a closed position in which said movable member closes said dispensing chamber opening and an open position in which said dispensing chamber opening is not closed by said movable member; and
      a passageway that couples said main chamber to said dispensing chamber, said passageway being sized to allow pieces of breakfast cereal to pass between said main chamber and said dispensing chamber.

16. A breakfast cereal dispensing product as defined in claim 15 wherein said product package comprises:
   a backing member; and
   a piece of transparent material attached to said backing member, said piece of transparent material covering either said breakfast cereal product or said breakfast cereal dispenser.

17. A breakfast cereal dispensing product as defined in claim 15 wherein said cereal box has a height of no greater than about 15 centimeters and a width of no greater than about 10 centimeters.

18. A breakfast cereal dispensing product as defined in claim 15 wherein said cereal box has a height of about 10 centimeters, a width of about seven centimeters, and a depth of about four centimeters.

19. A breakfast cereal dispensing product as defined in claim 15 wherein said dispensing structure comprises:
   a first hole formed in said dispensing structure;
   a second hole formed in said dispensing structure, said second hole being formed in a movable member; and
   a tab member coupled to said movable member, said tab member extending through an opening formed in said dispensing structure to allow a user to selectively position said movable member between a first position in which at least a portion of said second hole is aligned with said first hole so that a plurality of pieces of breakfast cereal can pass from said main chamber to said dispensing chamber when said pieces of breakfast cereal are disposed in said main chamber and a second position in which said second hole is not aligned with said first hole and in which a portion of said movable member blocks said first hole so that said pieces of breakfast cereal cannot pass from said main chamber to said dispensing chamber when said pieces of breakfast cereal are disposed in said main chamber.

20. A breakfast cereal dispensing product as defined in claim 15 wherein said container has a top portion having a diameter, a bottom portion having a diameter, and an intermediate portion disposed between said top portion and said bottom portion, said intermediate portion having a diameter that is less than said diameter of said top and bottom portions to facilitate said intermediate portion of said container to be gripped by a person's hand.

21. A breakfast cereal dispensing product as defined in claim 15 wherein said dispensing structure additionally comprises a locking structure that causes said movable member to be retained in said closed position.

* * * * *